July 28, 1936. W. P. COX 2,048,921

BRAKE SHOE

Filed April 23, 1934

INVENTOR:
William P. Cox

HIS ATTORNEYS

Patented July 28, 1936

2,048,921

UNITED STATES PATENT OFFICE 2,048,921

BRAKE SHOE

William P. Cox, Canton, Ohio, assignor to The Timken Roller Bearing Company, Canton, Ohio, a corporation of Ohio Application April 23, 1934, Serial No. 721,881

3 Claims. (Cl. 188—250)

This invention relates to shoes for friction brakes, clutches and the like, and more particularly to brake shoes for expanding brakes intended for use on vehicles. Such brake shoes are usually provided with an arcuate shoe portion provided on its outer face with a lining for cooperation with the brake drum and on its inner face with a longitudinal medial rib to which pressure is applied for engaging said shoe with said brake drum.

A practical objection to this construction of brake shoe is that the shoe is relatively rigid along its medial line due to the strengthening rib, while the side marginal portions of the shoe are unsupported and thus tend to flex or curl under load, whereby the pressure of the shoe upon the drum decreases outwardly from said rib toward the side marginal portions of the shoe. This uneven pressure between the brake shoe and the drum is liable to cause outward bowing of the drum, overheating of the lining and/or drum, uneven wear of the lining, scoring of the drum, and chattering, squealing, grabbing and dragging of the brake.

The invention has for its principal object to provide a brake shoe of the above type that maintains uniform contact over its entire surface with the brake drum. The invention consists in the brake shoe, and in the construction, combination and arrangements of parts hereinafter described and claimed.

In the accompanying drawing, which forms part of this specification and wherein like symbols refer to like parts wherever they occur, Fig. 1 is a vertical transverse sectional view of a brake drum, an elevation of a brake assembly provided with shoes embodying my invention being shown in connection therewith;

In the accompanying drawing, my invention is shown in connection with an expanding motor vehicle brake comprising a rotary brake drum C, a stationary bracket B, arcuate shoes A pivotally mounted at one end of said bracket and provided with linings D for cooperation with the inner surface of said drum, a rotary cam E cooperating with the free ends of said shoes for forcing them outwardly into engagement with the drum, and a spring F connecting the free ends of the shoes for pulling them clear of contact with the brake drum when the brake is released. This construction of brake is well known and it is considered unnecessary to illustrate it in detail.

Figure 1:
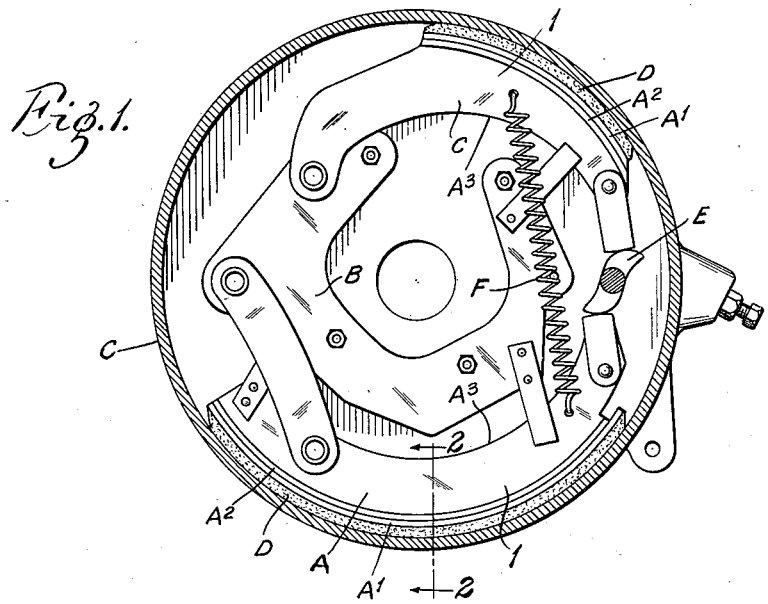
Figure 2:
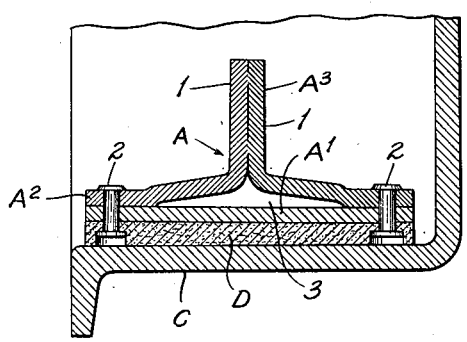
Fig. 2 is a section on the line 2—2 in Fig. 1.

According to the present invention, each of the brake shoes A comprises an arcuate shoe portion $A^1$, which forms a backing for the lining D, and an arcuate mounting portion $A^2$ on the inner side of said shoe and provided on its inner side with a stiffening or strengthening rib $A^3$ that extends longitudinally of said arcuate shoe portion substantially midway between the side edges thereof. As shown in Fig. 2 of the accompanying drawing, the arcuate mounting portion $A^2$ of the shoe is preferably made up of two angles 1 with two of their flanges welded or otherwise rigidly secured together flatwise to form the rib $A^3$, and with the other two flanges rigidly secured along their outer side margins only by rivets 2 to the corresponding side marginal portions of the arcuate shoe portion $A^1$. The rivets also serve to secure the lining D to the shoe portion $A^1$. The cooperating angles 1, which form the mounting portion $A^2$ of the shoe, have the oppositely extending flanges inclined away from the shoe portion $A^1$ from their riveted outer side margins to their abutting inner side edges, thereby providing a space 3 between the shoe portion $A^1$ and the mounting portion $A^2$ that limits the contact therebetween to the outer marginal portions thereof only.

By this arrangement, the shoe portion $A^1$ and the mounting portion $A^2$ cooperate to form a brake shoe of truss-like cross-section, which serves to transmit the pressure applied to the reinforcing rib $A^3$ to the outer side marginal portions only of the shoe, whereby the outer side marginal portions of the shoe are prevented from flexing or curling inwardly away from the drum, thus preventing uneven wear and heating of the lining, scoring, heating and bowing of the drum, and chattering, squealing, dragging and slipping of the brake.

Figure 3:
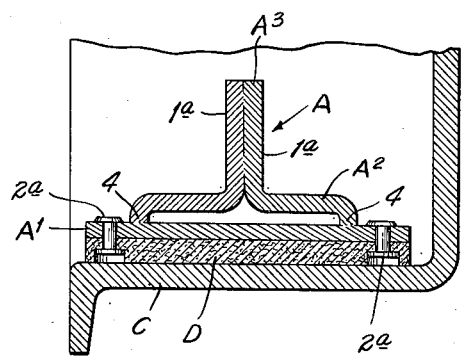
Fig. 3 is a view similar to Fig. 2 showing a shoe of modified form.

In the modification shown in Fig. 3, the two angles $1a$ that form the shoe mounting portion $A^2$ of the shoe are provided along the outer edges of their oppositely extending flanges with longitudinal ribs 4 that are welded or otherwise rigidly secured to the shoe portion $A^1$ of the shoe. The lining D is secured to the shoe portion $A^1$ by separate rivets $2a$ located between the outer side edges thereof and the corresponding outer side edges of the shoe mounting portion $A^2$. The longitudinal side marginal ribs 4 of the shoe mounting portion $A^2$ serve to limit the contact between said mounting portion and the shoe portion $A^1$ to the outer margins of the latter, and the two shoe portions cooperate with each other after the manner of the two shoe portions shown in Fig. 2, to form a truss-like cross-section which prevents flexing or curling of the outer margins of the shoe and bowing of the drum and distributes the braking load more evenly over the drum.

What I claim is:

1. A brake shoe comprising a shoe portion and a mounting portion provided with a longitudinal rib, said mounting portion comprising two angle members with two of their flanges secured together to form said rib and with the other two flanges secured along their outer margins to said shoe portion, said outer margins of said last mentioned flanges being provided with longitudinal ribs adapted to space the remaining portions thereof from said shoe portion.

2. A brake shoe comprising a shoe portion, a mounting portion provided with a longitudinal rib, said mounting portion comprising two angle members with two of their flanges secured together to form said rib and with the other two flanges secured along their outer margins to said shoe portion, said outer margins of said last mentioned flanges being provided with ribs adapted to space the remaining portions thereof from said shoe portion, and a lining secured to said shoe portion between the side edges thereof and the corresponding outer side edges of said angle members.

3. A brake shoe comprising a shoe portion and a mounting portion having a longitudinal medial rib and two outstanding base flanges secured along their outer portions to said shoe portion, said outer portions of said flanges being provided with ribs adapted to space the remaining portions thereof from said shoe portion.

WILLIAM P. COX.